(12) United States Patent
Kotecha et al.

(10) Patent No.: US 8,879,387 B2
(45) Date of Patent: Nov. 4, 2014

(54) TRANSMISSION CONTROL PROTOCOL (TCP) THROUGHPUT OPTIMIZATION IN POINT-TO-MULTIPOINT AND HETEROGENEOUS WIRELESS ACCESS NETWORKS

(75) Inventors: Lalit R. Kotecha, San Ramon, CA (US);
Sergio Aguirre, Southlake, TX (US);
Kamlesh S. Kamdar, Dublin, CA (US);
Raafat Edward Kamel, Little Falls, NJ (US); Aref Iskandar, Danbury, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 651 days.

(21) Appl. No.: 12/877,250

(22) Filed: Sep. 8, 2010

(65) Prior Publication Data

US 2012/0057462 A1    Mar. 8, 2012

(51) Int. Cl.
| | | |
|---|---|---|
| *H04L 1/00* | (2006.01) | |
| *G06F 15/16* | (2006.01) | |
| *H04L 12/855* | (2013.01) | |
| *H04L 29/06* | (2006.01) | |
| *H04L 12/863* | (2013.01) | |
| *H04L 12/801* | (2013.01) | |
| *H04W 80/04* | (2009.01) | |
| *H04W 80/06* | (2009.01) | |

(52) U.S. Cl.
CPC .......... *H04L 47/2466* (2013.01); *H04L 47/621* (2013.01); *H04L 47/14* (2013.01); *H04L 47/6215* (2013.01); *H04W 80/04* (2013.01); *H04W 80/06* (2013.01); *H04L 69/22* (2013.01); *H04L 69/163* (2013.01)
USPC .......................................... 370/232; 709/250

(58) Field of Classification Search
USPC ........................... 370/392; 709/230, 250, 203
See application file for complete search history.

(56) References Cited

U.S. PATENT DOCUMENTS

| | | | |
|---|---|---|---|
| 2002/0087732 A1* | 7/2002 | Boucher et al. | 709/250 |
| 2003/0074465 A1* | 4/2003 | Tang et al. | 709/237 |
| 2005/0179607 A1 | 8/2005 | Gorsuch et al. | |
| 2007/0173303 A1 | 7/2007 | Viorel et al. | |
| 2008/0080464 A1* | 4/2008 | Speight | 370/342 |
| 2009/0052420 A1* | 2/2009 | Fischer | 370/338 |
| 2010/0311321 A1 | 12/2010 | Norin | |
| 2010/0313232 A1 | 12/2010 | Norin | |

\* cited by examiner

*Primary Examiner* — Afshawn Towfighi (57) ABSTRACT

A device receives a packet provided in a wireless access network, and determines whether the packet is a payload packet or an acknowledgment (Ack) packet. The device also allocates, when the packet is an acknowledgement packet, the acknowledgment packet to an expedited priority queue, and allocates, when the packet is a payload packet, the payload packet to a regular priority queue. The device further delivers one or more acknowledgment packets provided in the expedited priority queue prior to delivering one or more payload packets provided in the regular priority queue.

20 Claims, 9 Drawing Sheets

TRANSMISSION CONTROL PROTOCOL (TCP) THROUGHPUT OPTIMIZATION IN POINT-TO-MULTIPOINT AND HETEROGENEOUS WIRELESS ACCESS NETWORKS

BACKGROUND

As wireless network data rates improve using third generation (3G), fourth generation (4G), and WiFi technologies, more and more bandwidth-intensive applications are being developed. A 4G wireless network is an all Internet protocol (IP) wireless access network in which different advanced multimedia application services (e.g., voice over IP (VoIP) content, video content, etc.) are delivered over IP.

The transmission control protocol (TCP) was originally designed for slow wired networks where no packet loss was expected. The TCP is also used to deliver a large portion of Internet protocol (IP) content over wireless access networks. Any packet loss in a TCP-based network is treated as network congestion and results in a sender (e.g., a device transmitting packets) reducing a rate at which data is sent. Furthermore, in TCP-based networks, a sender transmits packets at a faster rate if the sender detects, via TCP Acknowledgment (Ack) packets, that a receiver (e.g., a device receiving packets) is receiving packets at a faster rate. A TCP Ack packet is a packet used in the TCP to acknowledge receipt of a packet.

However, when a user device (e.g., a mobile communication device, a laptop computer, a set-top box (STB), etc.) connected to a wireless access network begins a bi-directional traffic flow (e.g., a file transfer protocol (FTP) upload or download), the user device may observe degraded throughput up to half of the original unidirectional throughput. This is due to the fact that TCP Ack packets are flowing in both directions at the same time that TCP payload packets are sent in both directions. Since the TCP payload packets and TCP Ack packets are treated with the same priority, a round trip time (RTT) for the packets almost doubles.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide bi-directional TCP throughput optimization in point-to-multipoint and heterogeneous wireless access networks. The systems and/or methods may provide a priority queue in wireless nodes (e.g., a user device, a wireless base station, a wireless network device, etc.) of a wireless access network, may detect TCP Ack packets in these wireless nodes, and may allocate the TCP Ack packets to the priority queue (e.g., for earlier delivery than other packets).

In one example implementation, the systems and/or methods may receive a packet provided in a wireless access network, and may determine whether the packet is a payload packet or an acknowledgment (Ack) packet. If the packet is determined to be an Ack packet, the systems and/or methods may allocate the Ack packet to an expedited priority queue. If the packet is determined to be a payload packet, the systems and/or methods may allocate the payload packet to a regular priority queue. The systems and/or methods may deliver one or more Ack packets, provided in the expedited priority queue, prior to delivering one or more payload packets provided in the regular priority queue. Such an arrangement may ensure that Ack packets (e.g., TCP Ack packets) are delivered with negligible latency.

As used herein, the terms "subscriber" and/or "user" may be used interchangeably. Also, the terms "subscriber" and/or "user" are intended to be broadly interpreted to include a user device (e.g., a mobile telephone, a personal computer, a set-top box, a television, etc.) or a user of a user device.

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
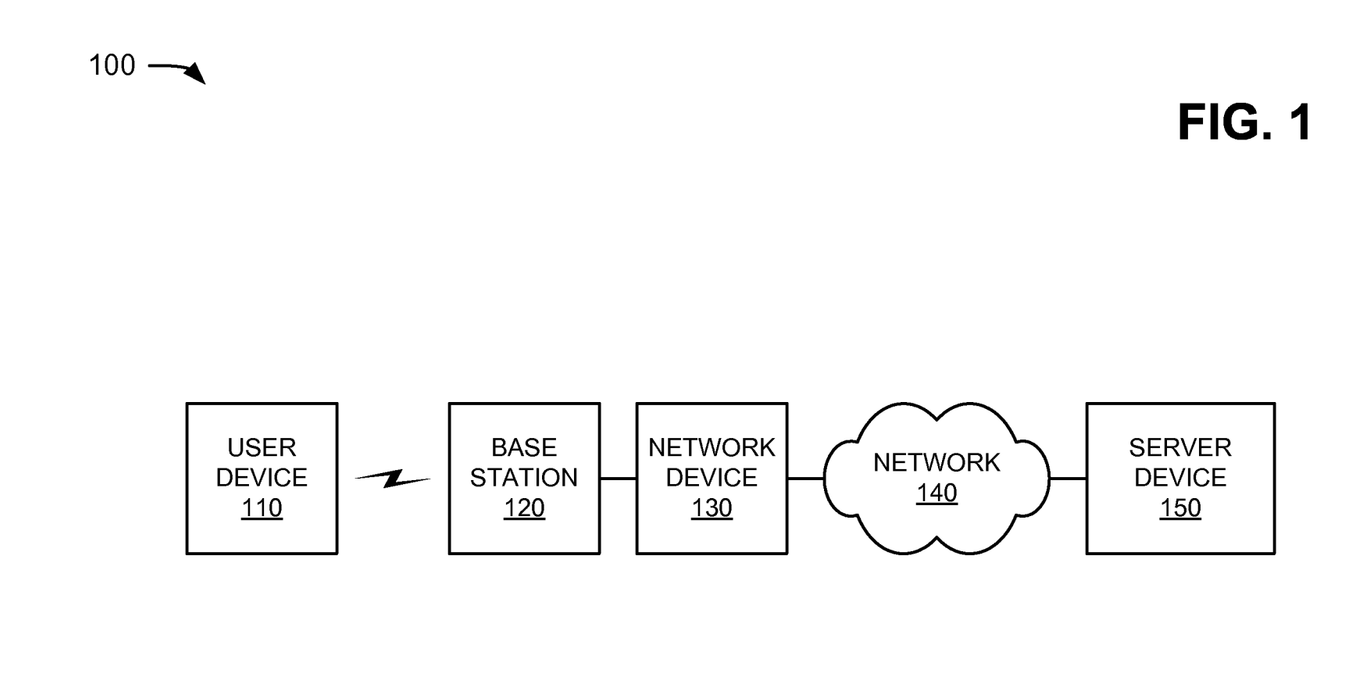
FIG. 1 is a diagram of an example network in which systems and/or methods described herein may be implemented.

FIG. 1 is a diagram of an example network 100 in which systems and/or methods described herein may be implemented. As illustrated, network 100 may include a user device 110, a base station 120, a network device 130, a network 140, and a server device 150. Components of network 100 may interconnect via wired and/or wireless connections. A single user device 110, base station 120, network device 130, network 140, and server device 150 have been illustrated in FIG. 1 for simplicity. In practice, there may be more user devices 110, base stations 120, network devices 130, networks 140, and/or server devices 150. In one example implementation, components of network 100 may utilize a transmission control protocol (TCP) for delivering content (e.g., packets) to and/or from one or more other components of network 100. In other implementations, components of network 100 may utilize other protocols, such as communication protocols (e.g., the Internet protocol) associated with the Internet Protocol Suite.

User device 110 may include any device that is capable of communicating with server device 150 via a wireless access network (e.g., provided by base station 120 and/or network device 130). For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a customer's home) computation and/or communication device, such as a laptop computer, a personal computer, a tablet computer, a set-top box (STB), a television, a gaming system, etc.

Base station 120 may include one or more computation and/or communication devices that receive voice and/or data (e.g., video content, FTP uploads/downloads, etc.) from server device 150 (e.g., via network device 130 and network 140) and wirelessly transmit that voice and/or data to user device 110. Base station 120 may also include one or more devices that wirelessly receive voice and/or data (e.g., a request for video content, a FTP request, etc.) from user device 110 and transmit that voice and/or data to server device 150 (e.g., via network device 130 and network 140).

Network device 130 may include one or more data transfer devices, such as a gateway, a router, a switch, a firewall, a network interface card (NIC), a hub, a bridge, a proxy server, an optical add-drop multiplexer (OADM), or some other type of device that processes and/or transfers data. In one example, network device 130 may include a mobile wireless gateway that provides a convergence point between wireless protocols (e.g., associated with user device 110 and/or base station 120) and IP protocols (e.g., associated with network 140 and/or server device 150). The mobile wireless gateway may route packets (or portions of packets) from a wireless network (e.g., user device 110 and base station 120) to another network (e.g., network 140). The mobile wireless gateway may combine functions of a wireless access point, a router, and a firewall, and may be referred to as a "converged device." In one implementation, network device 130 may receive requests for content from user device 110 (e.g., via base station 120), and may provide the requests for content to server device 150 (e.g., via network 140). Network device 130 may receive the requested content from server device 150, and may provide the content to user device 110 (e.g., via base station 120).

In one example implementation, one or more wireless nodes of network 100 (e.g., user device 110, base station 120, and/or network device 130) may receive a packet provided in network 100, and may determine whether the packet is a payload packet or an acknowledgment (Ack) packet. If the packet is determined to be an Ack packet, the wireless node(s) may allocate the Ack packet to an expedited priority queue (e.g., provided in a memory of the wireless node(s)). If the packet is determined to be a payload packet, the wireless node(s) may allocate the payload packet to a regular priority queue (e.g., provided in a memory of the wireless node(s)). The wireless node(s) may deliver one or more Ack packets, provided in the expedited priority queue, prior to delivering one or more payload packets provided in the regular priority queue. Further details of the wireless node(s) (e.g., user device 110, base station 120, and/or network device 130) are provided below in connection with one or more of FIGS. 2-4.

In one example, base station 120 and/or network device 130 may provide a wireless access network for user device 110. The wireless access network, in one implementation, may correspond to a 4G network, a Long Term Evolution (LTE) network, an advanced LTE network, etc. The LTE network may include a communications network that connects subscribers (e.g., user device 110) to a service provider (e.g., server device 150). In another implementation, the wireless access network may include a WiFi network or other access networks (e.g., an enhanced high-rate packet data (eHRPD) network or a WiMax network). In still other implementations, base station 120 and/or network device 130 may provide a wireless network for user device 110.

Network 140 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Server device 150 may include one or more server devices, or other types of computation or communication devices, that gather, process, search, and/or provide information in a manner described herein. In one implementation, server device 150 may include a computer system, an application, a cable head-end, and/or a broadcasting device capable of providing video content (e.g., video on demand (VOD) content, high definition (HD)-VOD content, TV programming, movies, on-demand services, live television, etc.), commercials, advertisements, instructions, voice content (e.g., voice over IP (VoIP)), and/or other information to user device 110.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
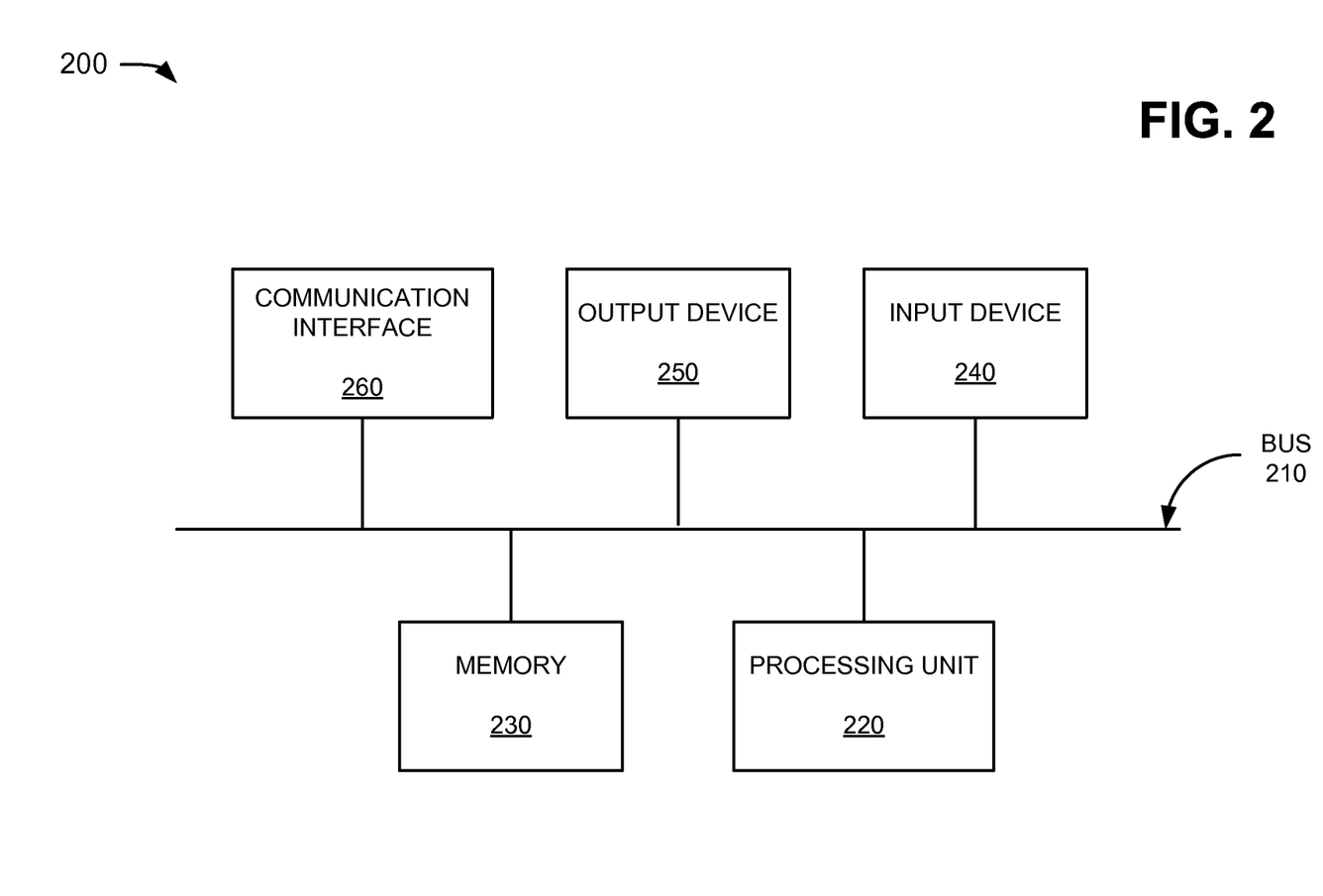
FIG. 2 is a diagram of example components of one or more of the devices of the network depicted in FIG. 1.

FIG. 2 is a diagram of example components of a device 200 that may correspond to one of the devices of network 100. In one implementation, device 200 may correspond to one of the devices of the networks depicted in FIGS. 5 and 6. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
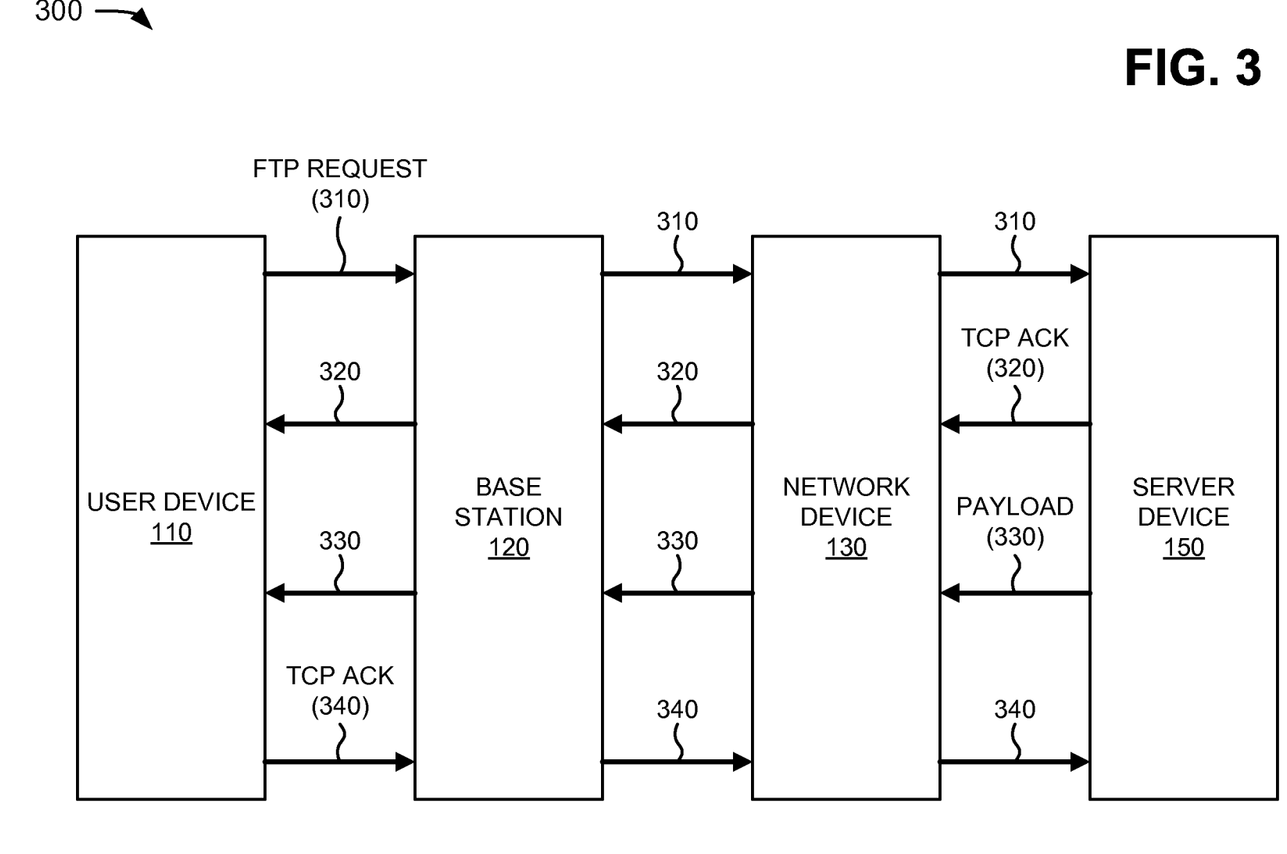
FIG. 3 is a diagram of example interactions between components of an example portion of the network depicted in FIG. 1.

FIG. 3 is a diagram of example interactions between components of an example portion 300 of network 100. As illustrated, example network portion 300 may include user device 110, base station 120, network device 130, and server device 150. User device 110, base station 120, network device 130, and server device 150 may include the features described above in connection with one or more of FIGS. 1 and 2.

As further shown in FIG. 3, a user (not shown) may utilize user device 110 to generate a FTP request 310 for content to be provided to user device 110. For example, the user may be viewing a menu of VOD content (e.g., via user device 110), and may select a video provided by the menu. User device 110 may wirelessly provide FTP request 310 to base station 120, and base station 120 may forward FTP request 310 to network device 130. Network device 130 may forward FTP request 310 to server device 150 (e.g., via network 140, not shown). Service device 150 may receive FTP request 310 from network device 130, and, in one example, may generate a TCP Ack packet 320 in response to FTP request 310. TCP Ack packet 320 may include a packet used to acknowledge receipt of a packet (e.g., one or more packets associated with FTP request 310). Server device 150 may provide TCP Ack packet 320 to network device 130, and network device 130 may provide TCP Ack packet 320 to base station 120. Base station 120 may wirelessly provide TCP Ack packet 320 to user device 110. TCP Ack packet 320 may provide an indication (e.g., to user device 110) of receipt of FTP request 310 by server device 150.

In addition to generating TCP Ack packet 320, server device 150 may search for the requested content (e.g., requested via FTP request 310), and may provide the requested content to network device 130 via one or more payload packets 330. Each of payload packets 330 may include control information (e.g., for addressing and routing) and a payload consisting of the requested content or a portion of the requested content. In one implementation, each of payload packets 330 may include any packet other than an Ack packet. Network device 130 may provide payload packets 330 to base station 120, and base station 120 may wirelessly provide payload packets 330 to user device 110. User device 110 may receive payload packets 330 and may provide payload packets 330 to the user.

When user device 110 receives payload packets 330, user device 110 may generate one or more TCP Ack packets 340 in response to payload packets 330. TCP Ack packets 340 may include packets used to acknowledge receipt of packets (e.g., payload packets 330). User device 110 may wirelessly provide TCP Ack packets 340 to base station 120, and base station 120 may provide TCP Ack packets 340 to network device 130. Network device 130, in turn, may provide TCP Ack packets 340 to server device 150. TCP Ack packets 340 may provide an indication (e.g., to server device 150) of receipt of payload packets 330 by user device 110.

In one example implementation, one or more wireless nodes of network portion 300 (e.g., user device 110, base station 120, and/or network device 130) may receive a packet (e.g., TCP Ack packets 320/340 or payload packets 330), and may determine whether the packet is a payload packet or an Ack packet. If the packet is determined to be an Ack packet (e.g., TCP Ack packets 320/340), the wireless node(s) may allocate TCP Ack packets 320/340 to an expedited priority queue (e.g., provided in a memory of the wireless node(s)). If the packet is determined to be a payload packet (e.g., payload packets 330), the wireless node(s) may allocate payload packets 330 to a regular priority queue (e.g., provided in a memory of the wireless node(s)). The wireless node(s) may deliver one or more Ack packets (e.g., TCP Ack packets 320 and 340), provided in the expedited priority queue, prior to delivering one or more payload packets (e.g., payload packets 330) provided in the regular priority queue.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
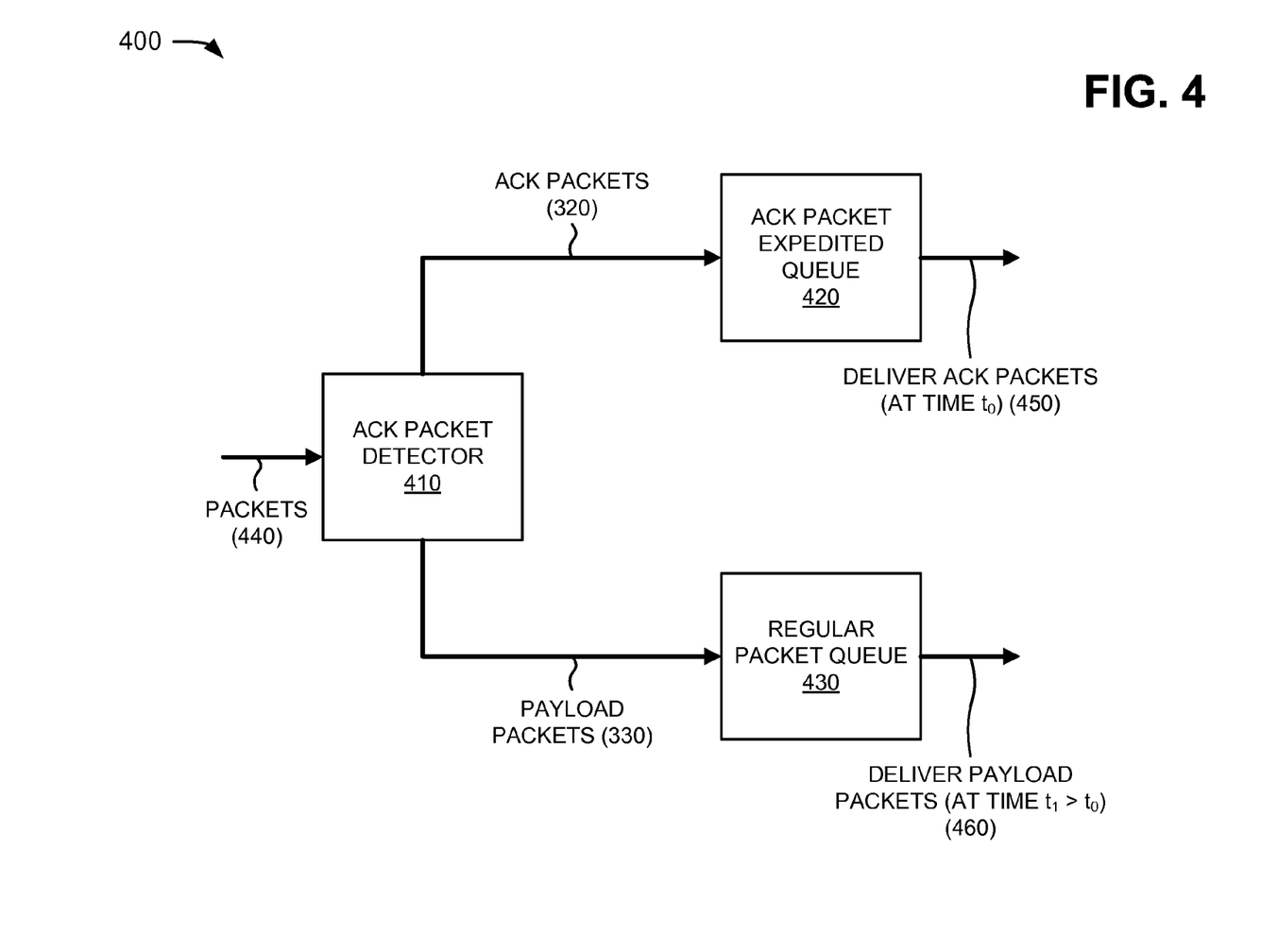
FIG. 4 is a diagram of example functional components of one or more of the devices of the network depicted in FIG. 1.
Figure 5:
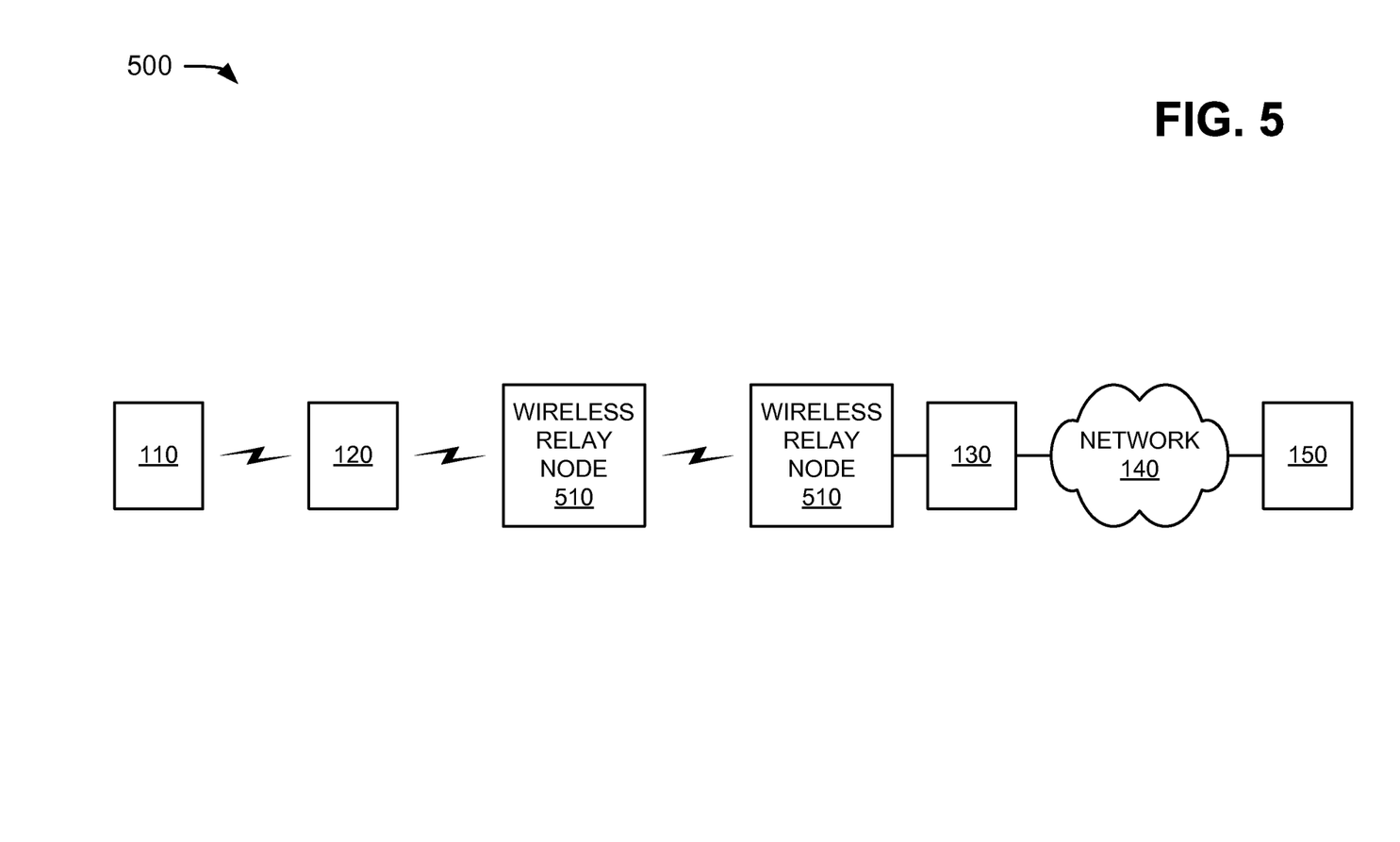
FIG. 5 is a diagram of another example network in which systems and/or methods described herein may be implemented.
Figure 6:
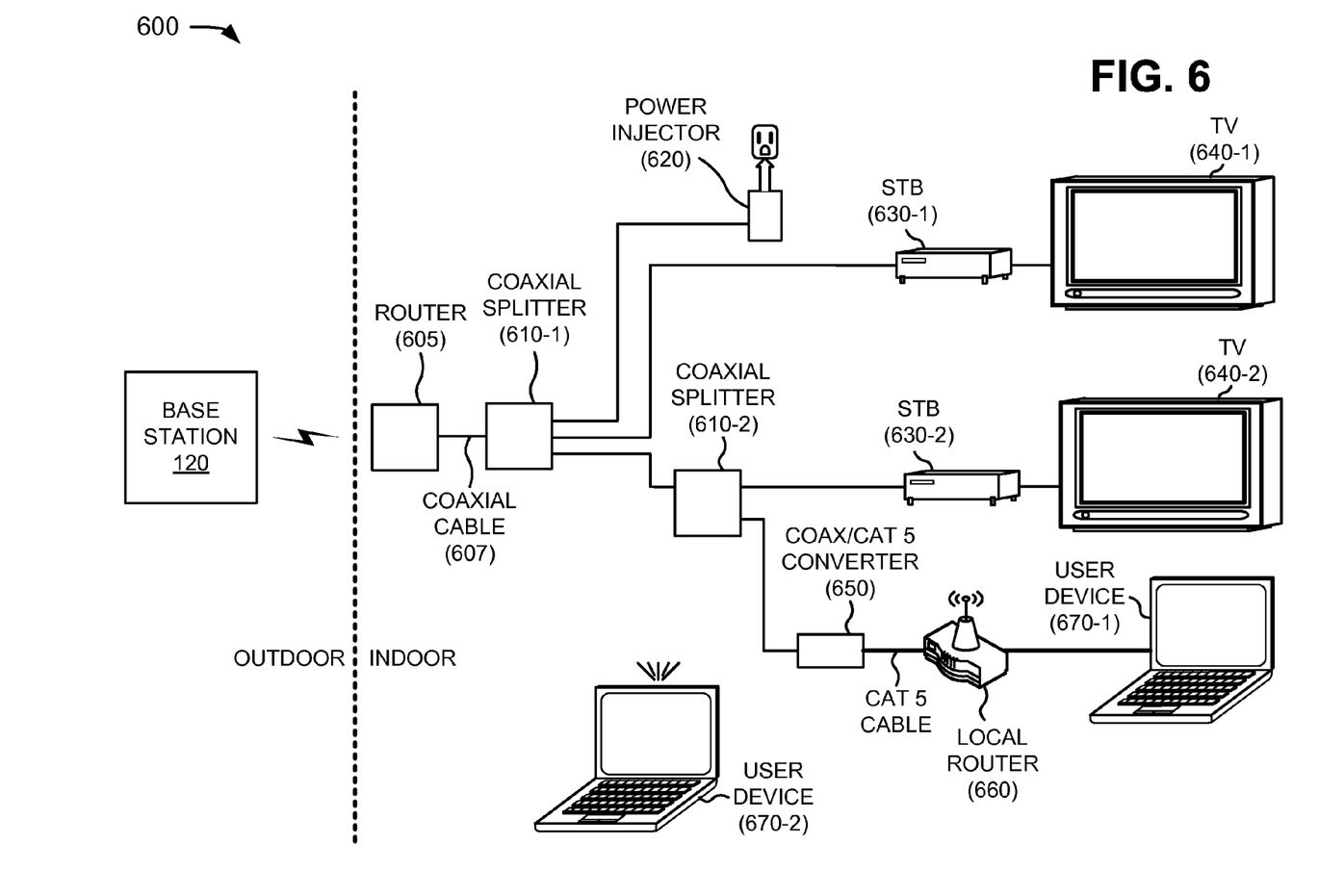
FIG. 6 is a diagram of still another example network in which systems and/or methods described herein may be implemented.

FIG. 4 is a diagram of example functional components of a device 400 that may correspond to one of the devices (e.g., user device 110, base station 120, network device 130, etc.) of network 100 and/or to one of the devices of the networks depicted in FIGS. 5 and 6. In one implementation, the functions described in connection with FIG. 4 may be performed by one or more components of device 200 (FIG. 2). As shown in FIG. 4, device 400 may include an Ack packet detector 410, an Ack packet expedited queue 420, and a regular packet queue 430.

Ack packet detector 410 may include hardware or a combination of hardware and software that may receive packets 440 (e.g., packets provided in network 100), and may determine whether packets 440 are Ack packets (e.g., TCP Ack packets) or payload packets (e.g., TCP payload packets). In one implementation, Ack packet detector 410 may determine whether packets 440 are Ack packets or payload packets based on a protocol associated with packets 440, a port(s) of device 400 that receives (or transmits) packets 440, sizes of packets 440, and/or other information. Ack packet detector 410 may provide packets determined to be Ack packets (e.g., Ack packets 320) to Ack packet expedited queue 420, and may provide packets determined to be payload packets (e.g., payload packets 330) to regular packet queue 430.

Ack packet expedited queue 420 may include hardware or a combination of hardware and software that may receive Ack packets 320 from Ack packet detector 410, and may buffer Ack packets 320 before they are delivered (e.g., to other devices of network 100). In one implementation, Ack packet expedited queue 420 may deliver Ack packets 320 at a particular time (e.g., time $t_0$), as indicated by reference number 450.

Regular packet queue 430 may include hardware or a combination of hardware and software that may receive payload packets 330 from Ack packet detector 410, and may buffer payload packets 330 before they are delivered (e.g., to other devices of network 100). In one implementation, regular packet queue 430 may deliver payload packets 330 at a time (e.g., time $t_1$) greater than the particular time that Ack packets 320 are delivered by Ack packet expedited queue 420 (i.e., time $t_1 > t_0$), as indicated by reference number 460. In other words, device 400 may prioritize Ack packets 320 over payload packets 330. In one example, if TCP throughput is defined as W/RTT (e.g., where W is a TCP window size and RTT is round trip time), payload packets 330 may take a time (e.g., RTT/2) to be delivered while Ack packets 320 may delivered with negligible latency (e.g., in substantially less time than RTT/2). In another example, device 400 may deliver payload packets 330 (e.g., in regular packet queue 430) only if Ack packet expedited queue 420 is empty (e.g., does not contain any Ack packets 320).

Although FIG. 4 shows example functional components of device 400, in other implementations, device 400 may include fewer functional components, different functional components, differently arranged functional components, and/or additional functional components than depicted in FIG. 4. Alternatively, or additionally, one or more functional components of device 400 may perform one or more other tasks described as being performed by one or more other functional components of device 400.

FIG. 5 is a diagram of another example network 500 in which systems and/or methods described herein may be implemented. As illustrated, example network 500 may include user device 110, base station 120, network device 130, network 140, server device 150, and one or more wireless relay nodes 510. User device 110, base station 120, network device 130, network 140, and server device 150 may include the features described above in connection with one or more of FIGS. 1-4. In one implementation, network 500 may correspond to a wireless heterogeneous network (e.g., a network connecting computers and other devices with different operating systems and/or protocols), a wireless mesh network, etc. The components of network 500 may interconnect via wired and/or wireless connections.

Wireless relay node 510 may include one or more wireless relay stations and/or small-coverage base stations (e.g., commonly referred to as access point base stations, home NodeBs, or femto cells). In one example, wireless relay node 510 may include the features of base station 120 and/or network device 130 described above. In one implementation, wireless relay node 510 may include the features of device 200 (FIG. 2) and/or device 400 (FIG. 4).

User device 110 may observe further degraded throughput in network 500 (e.g., than in network 100 of FIG. 1) due to the fact that TCP Ack packets are flowing in both directions at the same time that TCP payload packets are sent in both directions and are flowing through multiple wireless relay nodes 510. In order to address this degradation and in one example implementation, one or more wireless relay nodes 510 may receive a packet provided in network 500, and may determine whether the packet is a payload packet or an acknowledgment (Ack) packet. If the packet is determined to be an Ack packet, wireless relay node(s) 510 may allocate the Ack packet to an expedited priority queue (e.g., provided in a memory of wireless relay node(s) 510). If the packet is determined to be a payload packet, wireless relay node(s) 510 may allocate the payload packet to a regular priority queue (e.g., provided in a memory of wireless relay node(s) 510). Wireless relay node(s) 510 may deliver one or more Ack packets, provided in the expedited priority queue, prior to delivering one or more payload packets provided in the regular priority queue. Such an arrangement may ensure that Ack packets (e.g., TCP Ack packets) are delivered with negligible latency.

Although FIG. 5 shows example components of network 500, in other implementations, network 500 may include fewer components, different components, differently arranged components, and/or additional components than depicted in FIG. 5. Alternatively, or additionally, one or more components of network 500 may perform one or more other tasks described as being performed by one or more other components of network 500.

FIG. 6 is a diagram of still another example network 600 in which systems and/or methods described herein may be implemented. As illustrated, example network 600 may include base station 120 (e.g., which may be connected to network device 130, network 140, and/or server device 150 (not shown)) located outdoors. Base station 120 may include the features described above in connection with one or more of FIGS. 1-4. Components of network 600 may interconnect via wired and/or wireless connections.

As further shown in FIG. 6, network 600 may include a customer premises network (e.g., located indoors) that is capable of communicating with base station 120. As illustrated, the customer premises network may include an in-home router 605 (referred to generically as "router 605"), a coaxial cable 607, coaxial splitters 610-1 and 610-2 (referred to herein collectively as "coaxial splitters 610" or generically as "coaxial splitter 610"), a power injector 620, set-top boxes (STBs) 630-1 and 630-2 (referred to herein collectively as "STBs 630" or generically as "STB 630"), televisions 640-1 and 640-2 (referred to herein collectively as "televisions 640"), a coax/Cat 5 converter 650, a local router 660, and user devices 670-1 and 670-2 (referred to herein collectively as "user devices 670" or generically as "user device 670"). One router 605, one coaxial cable 607, two coaxial splitters 610, one power injector 620, two STBs 630, two televisions 640, one coax/Cat 5 converter 650, one local router 660, and two user devices 670 have been illustrated in FIG. 6 for simplicity. In practice, there may be more (or fewer) routers 605, coaxial cables 607, coaxial splitters 610, power injectors 620, STBs 630, televisions 640, coax/Cat 5 converters 650, local routers 660, and/or user devices 670. The components of the customer premises network may interconnect via wired and/or wireless connections.

Router 605 may include one or more data processing and/or data transfer devices, such as a gateway, a router, a modem, a switch, a firewall, a NIC, a hub, a bridge, a proxy server, an OADM, or some other type of device that processes and/or transfers data. In one implementation, router 605 may include the features of device 200 (FIG. 2) and/or device 400 (FIG. 4).

In one example, router 605 may communicate with an outdoor broadband unit and a satellite antenna (not shown) that may communicate with base station 120. The outdoor broadband unit may include one or more data processing and/or data transfer devices, such as a gateway, a router, a modem, a switch, a firewall, a NIC, a hub, a bridge, a proxy server, an OADM, or some other type of device that processes and/or transfers data. The outdoor broadband unit may be physically deployed with the satellite antenna (e.g., on a roof or a side wall of a house associated with the customer premises network). For example, the outdoor broadband unit may utilize a pre-existing or new satellite TV installation in a way that both broadband (over LTE) service and satellite TV are brought indoors (e.g., inside the customer premises) over a single coaxial cable (e.g., coaxial cable 607). In another example, the outdoor broadband unit may be omitted and the functionality of the outdoor broadband unit may be implemented by router 605. In still another example, router 605 may be omitted and the functionality of router 605 may be implemented by the outdoor broadband unit.

The satellite antenna may provide an interface for television service broadcast from satellites. In one implementation, the satellite antenna may provide an entry point (e.g., for the customer premises network) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 630). The satellite antenna may communicate with an STB 630 to identify which blocks of channels can be used to send television signals to that particular STB 630.

Coaxial splitters 610 may include conventional splitting technologies to filter LTE and satellite TV signals. In one implementation, each coaxial splitter 610 may include a SWiM splitter. For example, coaxial splitters 610 may facilitate allocating logical channels using different frequency blocks for viewer-selected television programming and broadband signals to the SWiM-compatible STBs 630 and/or local router 660.

Power injector 620 may include a conventional mechanism for injecting direct current (DC) power in a coaxial cable (e.g., coaxial cable 607) to power remotely-located devices, such as the outdoor broadband unit. Use of power injector 620 may allow components of the outdoor broadband unit to be powered via a coaxial cable (e.g., coaxial cable 607) and eliminate the need for additional wiring.

STB 630 may include a device that receives and/or processes video content (e.g., from a satellite TV provider via the satellite antenna), and provides the video content to television 640 or another device. STB 630 may also include decoding and/or decryption capabilities and may further include a digital video recorder (DVR) (e.g., a hard drive). In one example implementation, STB 630 may be incorporated directly within television 640. In another implementation, STB 630 and/or television 640 may be replaced with a computing device (e.g., a personal computer, a laptop computer, a tablet computer, etc.), a cable card, a TV tuner card, or a portable communication device (e.g., a mobile telephone or a PDA). In one implementation, STB 630 may conform to MoCA and SWiM standards.

Television 640 may include a television monitor that is capable of displaying video content, television programming, content provided by STB 630, and/or content provided by other devices (e.g., a digital video disk (DVD) player, a video camera, etc., not shown) connected to television 640. Coax-to-Cat 5 adapter 650 may include a conventional device to convert incoming signals from coaxial cables to outgoing signals on Cat 5 cables.

Local router 660 may include a device that may provide connectivity between equipment within customer premises (e.g., user devices 670) and between the customer premises equipment and an external network (e.g., base station 120). In one implementation, local router 660 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., WiFi). In other implementations, different short-range wireless protocols and/or frequencies may be used. Local router 660 may also include one or more wired (e.g., Ethernet) connections. In one implementation, local router 660 may include a USB Ethernet Router that is capable of meeting LTE quality of service (QoS) standards.

User device 670 may include any device that is capable of communicating with the customer premises network via local router 660. For example, user device 670 may include a mobile computation and/or communication device, such as a laptop computer, a radiotelephone, a PCS terminal (e.g., that may combine a cellular radiotelephone with data processing and data communications capabilities), a PDA (e.g., that can include a radiotelephone, a pager, Internet/intranet access, etc.), a wireless device, a smart phone, a GPS device, a content recording device (e.g., a camera, a video camera, etc.), etc. In another example, user device 670 may include a fixed (e.g., provided in a particular location, such as within a customer's home) computation and/or communication device, such as a laptop computer, a personal computer, a tablet computer, a gaming system, etc.

In one example, one or more of STBs 630, televisions 640, and/or user devices 670 may operate simultaneously and may generate bi-directional TCP traffic. Such devices may observe degraded throughput in network 600 due to the fact that TCP Ack packets are flowing in both directions at the same time that TCP payload packets are sent in both directions and are flowing through multiple devices. In order to address this degraded throughput and in one example implementation, router 605 may receive a packet provided in network 600, and may determine whether the packet is a payload packet or an acknowledgment (Ack) packet. If the packet is determined to be an Ack packet, router 605 may allocate the Ack packet to an expedited priority queue (e.g., provided in a memory of router 605). If the packet is determined to be a payload packet, router 605 may allocate the payload packet to a regular priority queue (e.g., provided in a memory of router 605). Router 605 may deliver one or more Ack packets, provided in the expedited priority queue, prior to delivering one or more payload packets provided in the regular priority queue. Such an arrangement may ensure that Ack packets (e.g., TCP Ack packets) are delivered with negligible latency.

Although FIG. 6 shows example components of network 600, in other implementations, network 600 may include fewer components, different components, differently arranged components, and/or additional components than depicted in FIG. 6. Alternatively, or additionally, one or more components of network 600 may perform one or more other tasks described as being performed by one or more other components of network 600.

Figure 7:
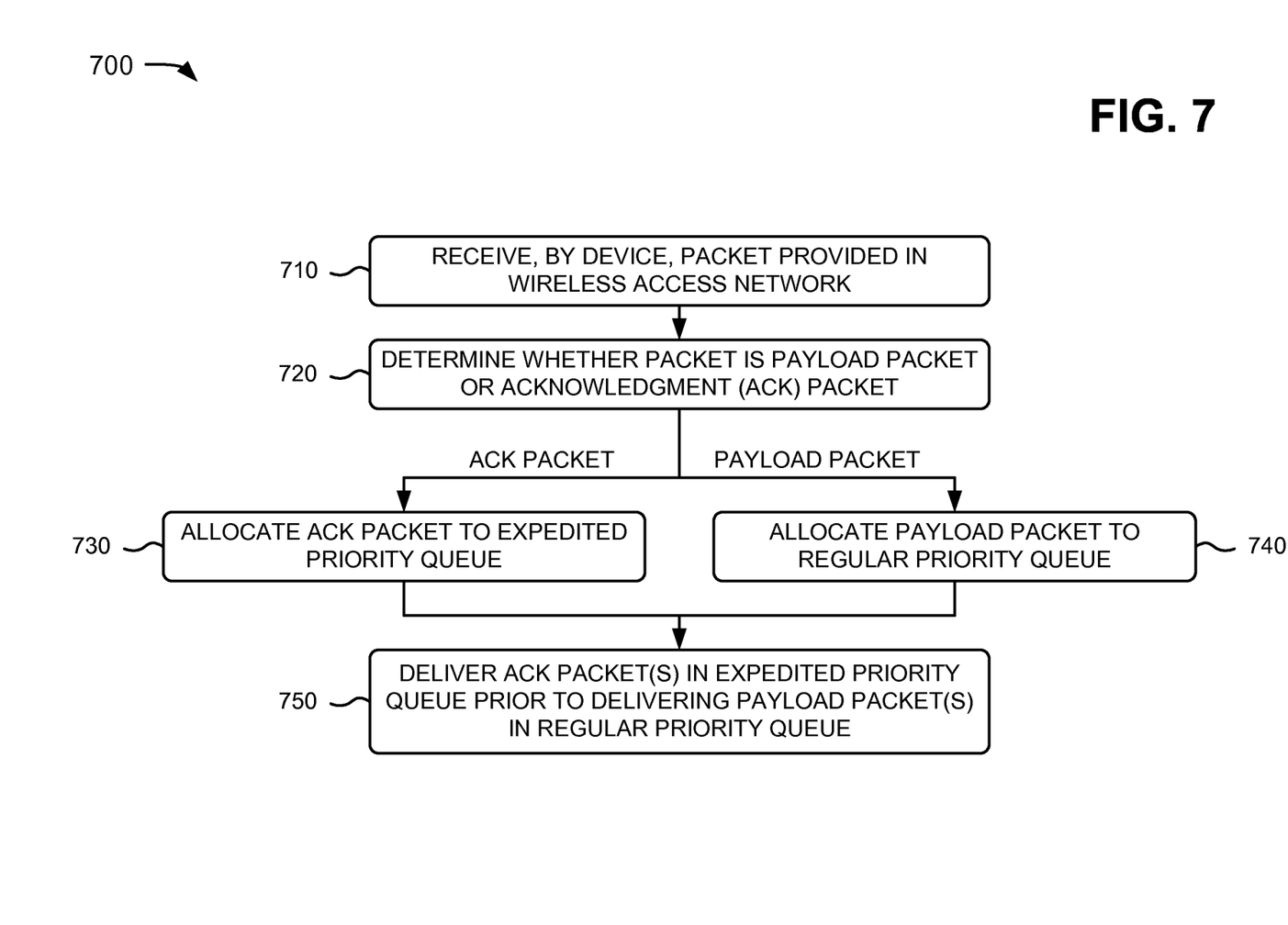
FIGS. 7-9 are flow charts of an example process for providing bi-directional TCP throughput optimization in point-to-multipoint and heterogeneous wireless access networks according to implementations described herein.
Figure 8:
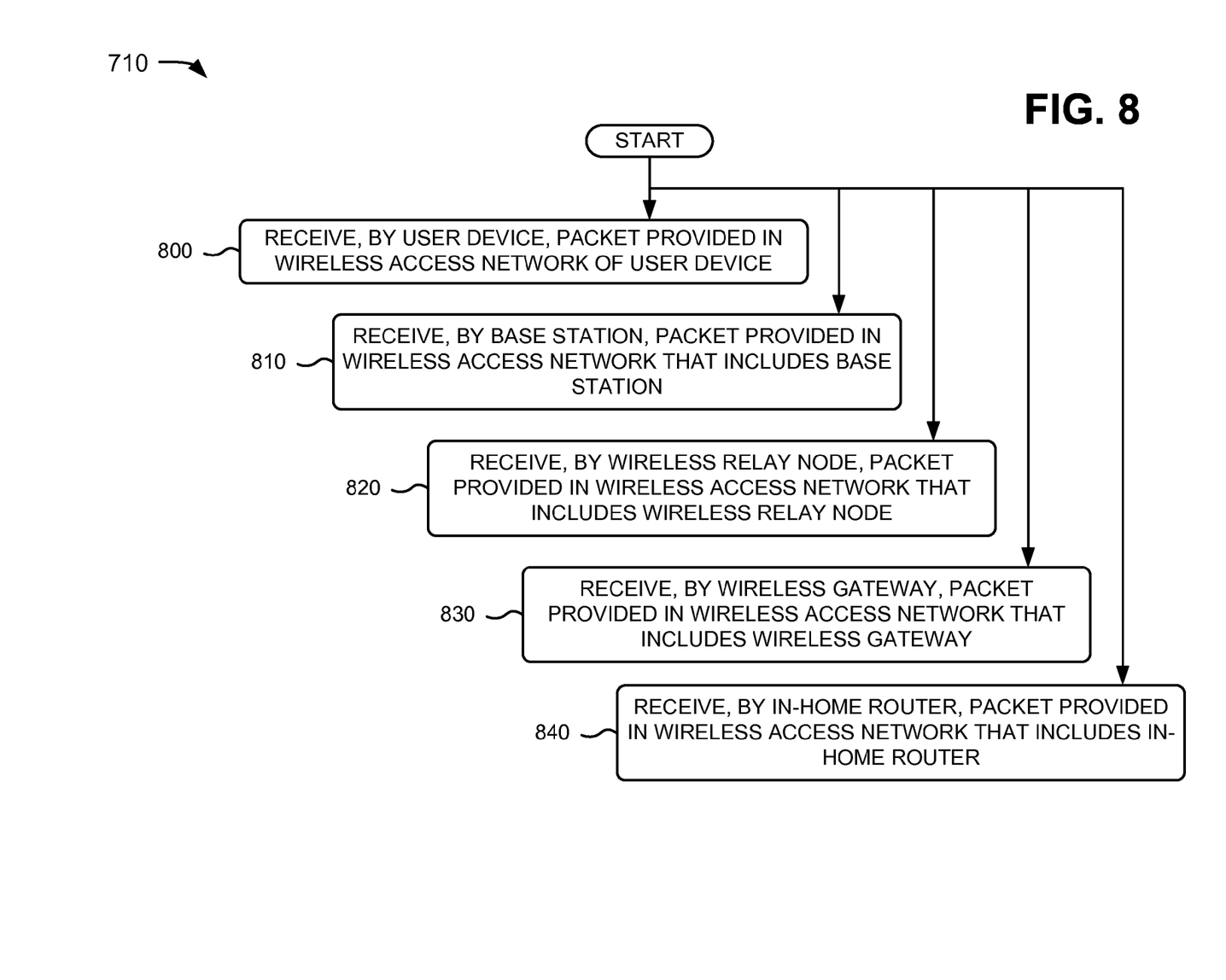
Figure 9:
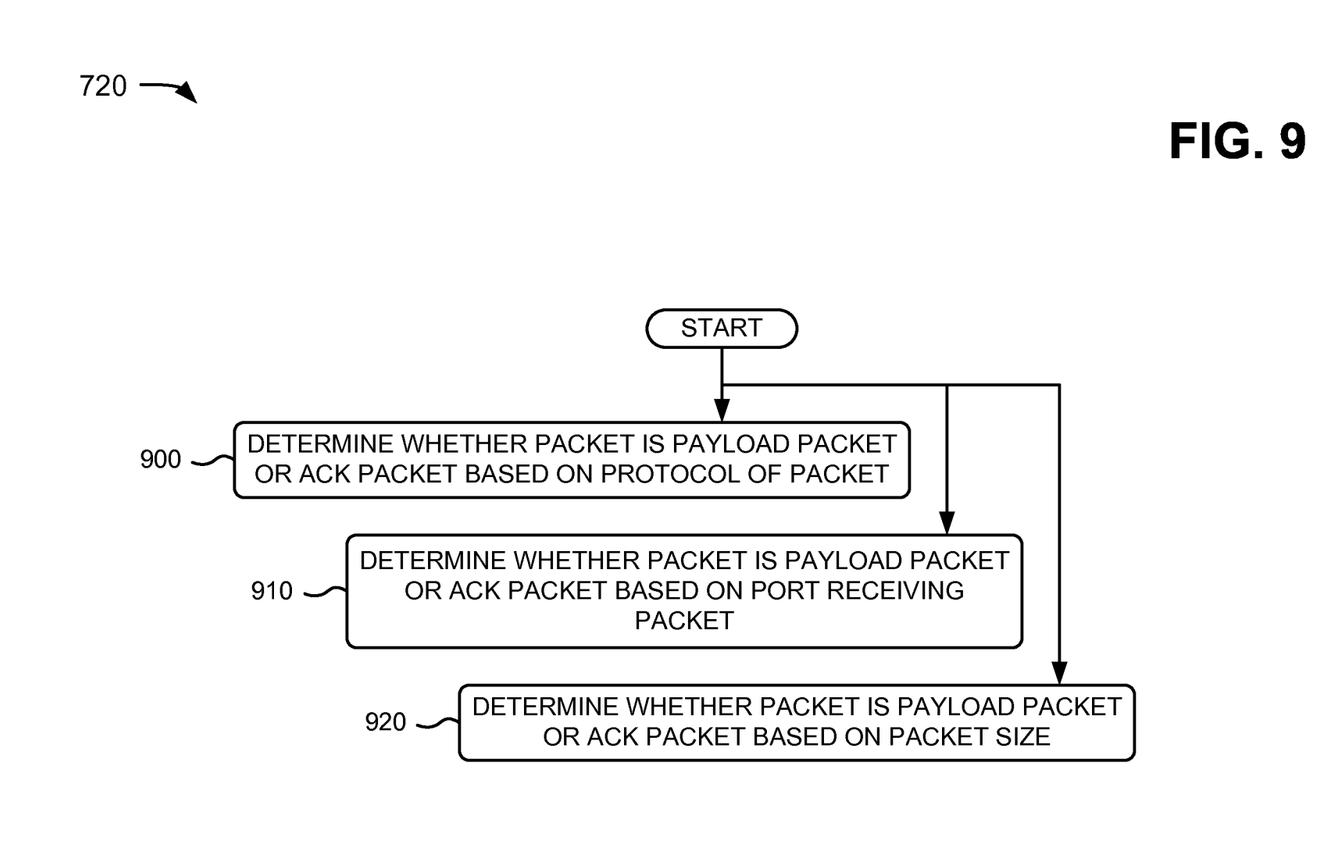

FIGS. 7-9 are flow charts of an example process 700 for providing bi-directional TCP throughput optimization in point-to-multipoint and heterogeneous wireless access networks according to implementations described herein. In one implementation, process 700 may be performed by one or more of user device 110, base station 120, network device 130, wireless relay node 510, and router 605. In another implementation, some or all of process 700 may be performed by another device or group of devices, including or excluding user device 110, base station 120, network device 130, wireless relay node 510, and/or router 605.

As illustrated in FIG. 7, process 700 may include receiving, by a device, a packet provided in a wireless access network (block 710), and determining whether the packet is a payload packet or an acknowledgment (Ack) packet (block 720). For example, in implementations described above in connection with FIG. 4, Ack packet detector 410 of device 400 may receive packets 440 (e.g., packets provided in network 100), and may determine whether packets 440 are Ack packets (e.g., TCP Ack packets) or payload packets (e.g., TCP payload packets).

As further shown in FIG. 7, if the packet is determined to be an Ack packet (block 720—ACK PACKET), process 700 may include allocating the Ack packet to an expedited priority queue (block 730). If the packet is determined to be a payload packet (block 720—PAYLOAD PACKET), process 700 may include allocating the payload packet to a regular priority queue (block 740). For example, in implementations described above in connection with FIG. 4, Ack packet detector 410 of device 400 may provide packets determined to be Ack packets (e.g., Ack packets 320) to Ack packet expedited queue 420, and may provide packets determined to be payload packets (e.g., payload packets 330) to regular packet queue 430.

Returning to FIG. 7, process 700 may include delivering one or more Ack packets provided in the expedited priority queue prior to delivering one or more payload packets provided in the regular priority queue (block 750). For example, in implementations described above in connection with FIG. 4, Ack packet expedited queue 420 of device 400 may receive Ack packets 320 from Ack packet detector 410, and may buffer Ack packets 320 before they are delivered (e.g., to other devices of network 100). In one example, Ack packet expedited queue 420 may deliver Ack packets 320 at a particular time (e.g., time $t_0$), as indicated by reference number 450. Regular packet queue 430 of device 400 may receive payload packets 330 from Ack packet detector 410, and may buffer payload packets 330 before they are delivered (e.g., to other devices of network 100). In one example, regular packet queue 430 may deliver payload packets 330 at a time (e.g., time $t_1$) greater than the particular time that Ack packets 320 are delivered by Ack packet expedited queue 420 (i.e., time $t_1 > t_0$), as indicated by reference number 460. In other words, device 400 may prioritize Ack packets 320 over payload packets 330.

Process block 710 may include the process blocks depicted in FIG. 8. As shown in FIG. 8, process block 710 may include one or more of receiving, by a user device, a packet provided in a wireless access network of the user device (block 800), receiving, by a base station, a packet provided in a wireless access network that includes the base station (block 810), receiving, by a wireless relay node, a packet provided in a wireless access network that includes the wireless relay node (block 820), receiving, by a wireless gateway, a packet provided in a wireless access network that includes the wireless gateway (block 830), and receiving, by an in-home router, a packet provided in a wireless access network that includes the in-home router (block 840). For example, in implementations described above in connection with FIG. 3, one or more wireless nodes of network portion 300 (e.g., user device 110, base station 120, and/or network device 130) may receive a packet (e.g., TCP Ack packets 320/340 or payload packets 330). In another example, as described above in connection with FIG. 5, one or more wireless relay nodes 510 may receive a packet provided in network 500. In still another example, as described above in connection with FIG. 6, router 605 may receive a packet provided in network 600.

Process block 720 may include the process blocks depicted in FIG. 9. As shown in FIG. 9, process block 720 may include one or more of determining whether the packet is a payload packet or an Ack packet based on a protocol of the packet (block 900), determining whether the packet is a payload packet or an Ack packet based on a port receiving the packet (block 910), and determining whether the packet is a payload packet or an Ack packet based on a size of the packet (block 920). For example, in implementations described above in connection with FIG. 4, Ack packet detector 410 of device 400 may determine whether packets 440 are Ack packets or payload packets based on a protocol associated with packets 440, a port(s) of device 400 that receives (or transmits) packets 440, sizes of packets 440, and/or other information.

Systems and/or methods described herein may provide bi-directional TCP throughput optimization in point-to-multipoint and heterogeneous wireless access networks. The systems and/or methods may provide a priority queue in wireless nodes (e.g., a user device, a wireless base station, a wireless network device, etc.) of a wireless access network, may detect TCP Ack packets in these wireless nodes, and may allocate the TCP Ack packets to the priority queue (e.g., for earlier delivery than other packets).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device, a packet provided in a wireless access network;
   responsive to receiving the packet, performing at least one of:
      determining, by the computing device, a receiving port of the computing device that received the packet,
      determining, by the computing device, a transmission port that transmitted the received packet, or
      determining, by the computing device, a size of the received packet;
   determining, by the computing device, in response to receiving the packet whether the received packet is a payload packet or an acknowledgment (Ack) packet, wherein the determining is based on at least one of:
      the receiving port
      the transmission port, or the size of the received packet;

allocating, by the computing device and when the received packet is an acknowledgement packet, the acknowledgment packet to an expedited priority queue;
allocating, by the computing device and when the received packet is a payload packet, the payload packet to a regular priority queue; and
delivering, by the computing device, one or more acknowledgment packets provided in the expedited priority queue prior to delivering one or more payload packets provided in the regular priority queue.

2. The method of claim 1, where the computing device includes one or more of:
a user device of the wireless access network,
a base station of the wireless access network,
a wireless relay node of the wireless access network,
a wireless gateway of the wireless access network, or
an in-home router of the wireless access network.

3. The method of claim 1, where the wireless access network includes a Long Term Evolution (LTE) network.

4. The method of claim 1, wherein determining whether the received packet is a payload packet or an acknowledgment (Ack) packet includes at least two of:
determining whether the received packet is a payload packet or an acknowledgment packet based on the receiving port;
determining whether the received packet is a payload packet or an acknowledgment packet based on the transmission port; or
determining whether the received packet is a payload packet or an acknowledgment packet based on the size of the received packet.

5. The method of claim 1, where the received packet includes one of:
a transmission control protocol (TCP) acknowledgment packet, or
a transmission control protocol payload packet.

6. The method of claim 1, where:
the one or more payload packets are delivered within one half of a round trip time (RTT), and
the one or more acknowledgment packets are delivered in substantially less time than one half the round trip time.

7. The method of claim 1, where the expedited priority queue buffers the one or more acknowledgment packets before the one or more acknowledgment packets are delivered to other devices of the wireless access network.

8. The method of claim 7, where the regular priority queue buffers the one or more payload packets before the one or more payload packets are delivered to the other devices of the wireless access network.

9. A device, comprising:
a memory to store a plurality of instructions; and
a processor to execute instructions in the memory to:
receive a first packet and a second packet provided in a wireless access network,
determine a received packet type for each of the first packet and the second packet, and
wherein determining the packet type is based on at least one of:
determining a port of the device that receives the first packet or the second packet,
determining a port of the device that transmits the received first packet or the second packet, or
determining the size of the received first packet or the second packet;
identify, whether the received first packet or the second packet is a payload packet or an acknowledgment (Ack) packet, wherein the identifying is based on at least one of:
the receiving port, the transmit port, or the size of the received first packet or the received second packet;
allocate, when the at least one of the first packet or the second packet is identified as an acknowledgment packet, the first packet or the second packet to an expedited priority queue stored in the memory,
allocate, when the at least one of the first packet or the second packet is identified as the payload packet, the first packet or the second packet to a regular priority queue stored in the memory, and
deliver the acknowledgment packet provided in the expedited priority queue prior to delivering the payload packet provided in the regular priority queue.

10. The device of claim 9, where the device includes one or more of:
a user device of the wireless access network,
a base station of the wireless access network,
a wireless relay node of the wireless access network,
a wireless gateway of the wireless access network, or
an in-home router of the wireless access network.

11. The device of claim 10, where the user device includes one or more of:
a radiotelephone,
a personal communications system (PCS) terminal,
a personal digital assistant (PDA),
a wireless device,
a smart phone,
a laptop computer,
a global positioning system (GPS) device,
a content recording device,
a personal computer, a tablet computer,
a set-top box (STB),
a television, or
a gaming system.

12. The device of claim 10, where the in-home router is associated with a customer premises network.

13. The device of claim 9, where the wireless access network includes one or more of:
a Long Term Evolution (LTE) network,
a heterogeneous network,
a fourth generation (4G) network,
a WiFi network,
an enhanced high-rate packet data (eHRPD) network, or
a WiMax network.

14. The device of claim 9, wherein the received first packet is identified as a payload packet and the received second packet is identified as an acknowledgment packet based on one or more of:
one or more ports of the device that receive the first packet and the second packet, or sizes of the received first packet and the received second packet.

15. The device of claim 9, where the received first packet is a transmission control protocol (TCP) payload packet and the received second packet is a transmission control protocol acknowledgment packet.

16. The device of claim 9, where:
the payload packet is delivered within one half of a round trip time (RTT), and
the acknowledgment packet is delivered in substantially less time than one half the round trip time.

17. The device of claim 9, where the expedited priority queue buffers the acknowledgment packet before the acknowledgment packet is delivered to other devices of the wireless access network.

18. The device of claim 17, where the regular priority queue buffers the payload packet before the payload packet is delivered to the other devices of the wireless access network.

19. The device of claim 9, where the acknowledgment packet and the payload packet are associated with a file transport protocol (FTP) upload or download.

20. A system, comprising:
- means for receiving a plurality of packets provided in a wireless access network;
- responsive to the means for receiving the plurality of packets, performing at least one of:
  - determining, for each packet of the received plurality of packets a received port, a transmitted port, or a received packet size;
- means for determining whether each of the plurality of received packets is a payload packet or an acknowledgment (Ack) packet, wherein the means for determining is based on at least one of the port of the system that received the packet, the port of the system that transmits the packet, or the received packet size;
- means for allocating the determined acknowledgement packets to an expedited priority queue;
- means for allocating the determined payload packets to a regular priority queue; and
- means for delivering one or more acknowledgment packets provided in the expedited priority queue prior to delivering one or more payload packets provided in the regular priority queue.

* * * * *